May 7, 1946.  M. J. MARTY  2,399,750
FASTENING DEVICE
Filed April 8, 1943  2 Sheets-Sheet 2
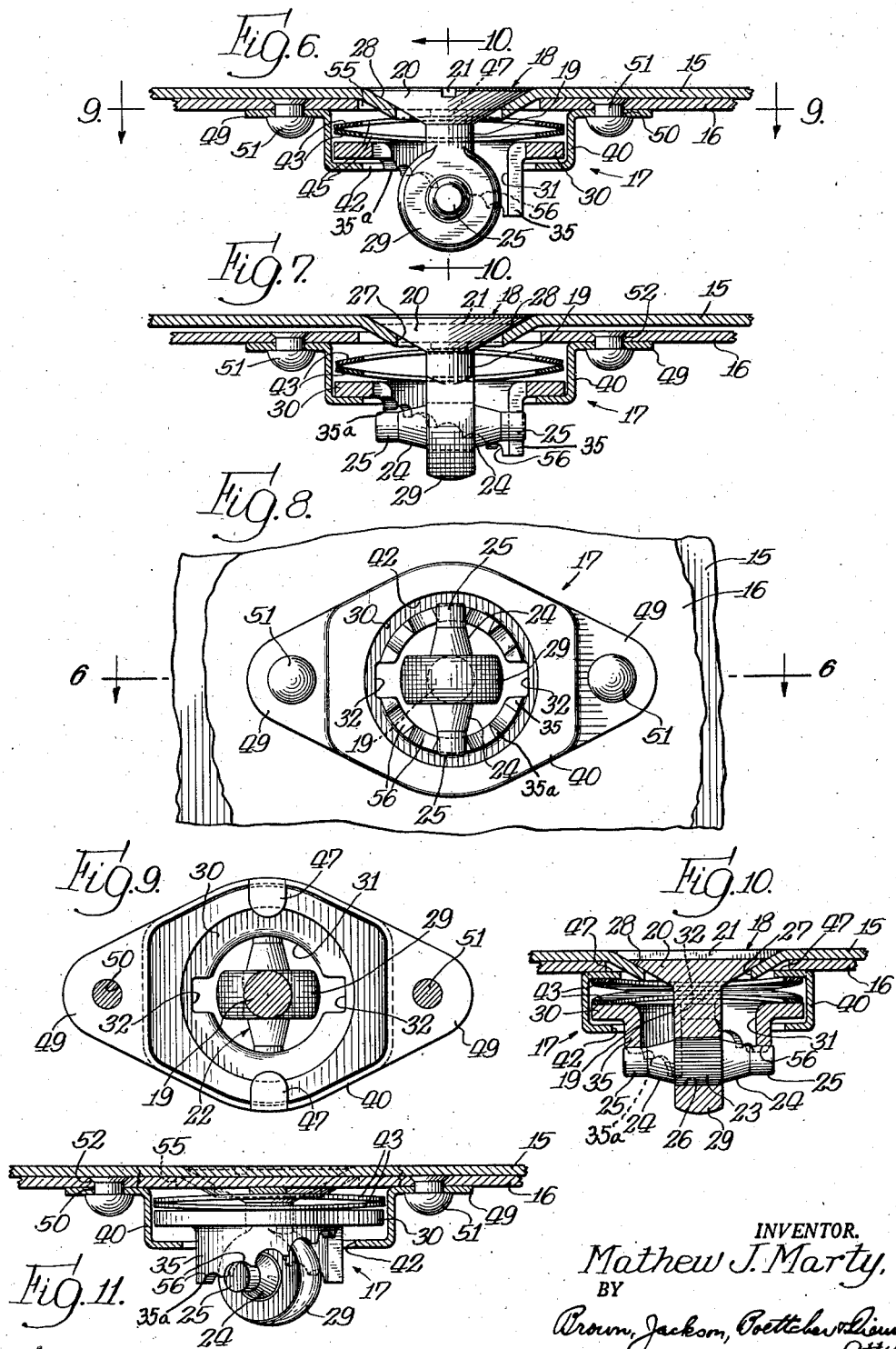
INVENTOR.
Mathew J. Marty.

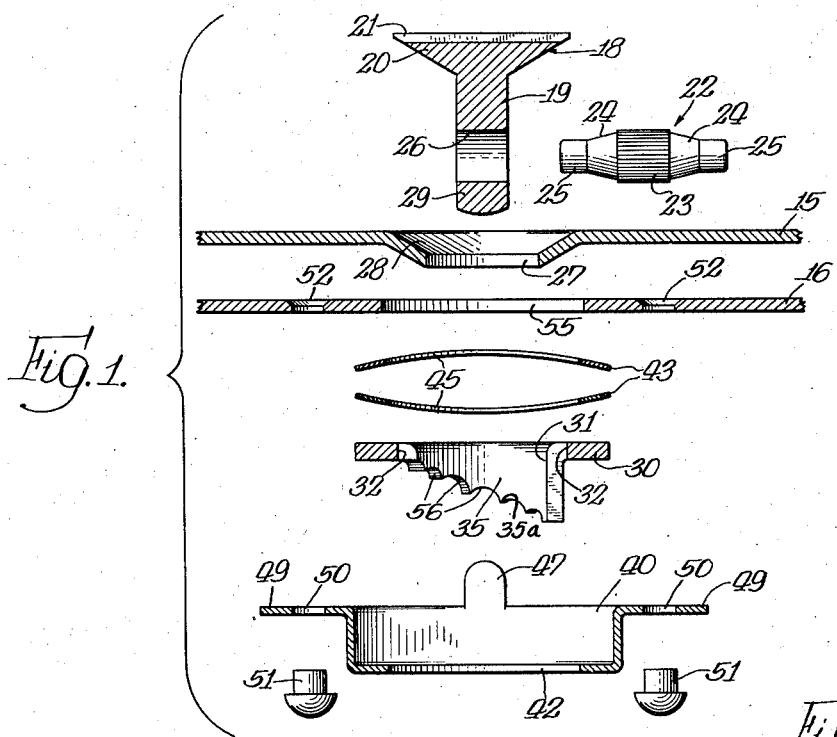

Patented May 7, 1946

2,399,750

UNITED STATES PATENT OFFICE 2,399,750

FASTENING DEVICE

Mathew J. Marty, Chicago, Ill.

Application April 8, 1943, Serial No. 482,280

2 Claims. (Cl. 24—221)

The present invention relates to a fastening device, and more particularly to a fastening device of a character for detachably securing two parts together. The invention is particularly adapted for use in detachably securing two plates or panel members together; for example, the cowlings of airplanes and other parts thereof.

The fastening device of my present invention is of the class comprising a pair of interlocking elements adapted to be interlocked by rotating one of the elements relative to the other. In my prior application, Serial No. 450,388, filed July 10, 1942, which has matured into Patent No. 2,337,483, issued December 21, 1943, I have disclosed a fastening device of the general class referred to, which incorporates among other features the provision of a bowed spring member of thin stock which is disposed between a cam plate member carried within a housing fixed to one of the panels or parts to be secured together and the panel carrying the housing. Upon engagement of the rotatable fastening element with the cam member, the spring is compressed to bias the panel members together. While the fastening device of my above referred to application has proven satisfactory, I have found that upon continued use of the fastening device a spring member of this character will become fatigued and take a "set." Also, in the device of my earlier application, the rotatable fastening element and the stationary fastening element have but one interlocked position, and the parts must therefore be designed to fit a particular installation wherein the thicknesses of the panels to be secured together is known.

According to my present invention, I propose to provide a pair of concavo-convex spring members which are assembled with the concave surfaces facing each other, but otherwise assembled with respect to a plate member of a stationary fastening element in the manner disclosed in my above identified application. In this manner the opposed spring members will act, when the parts are interlocked, yieldingly to bias the panel members toward each other, and when the rotatable element is rotated to its unlocked position with respect to the stationary element, the spring members act to force each other apart, thereby avoiding the aforesaid objection of the spring members taking a "set" after continued use of the fastening device. Further, in the fastening device herein disclosed I have provided a plate member comprising flanges having inclined edges in which a plurality of notches are formed to receive the ends of a cross pin carried by the rotatable element so that the fastening device may be used for a large number of installations wherein the thickness of the panels to be detachably secured together may vary or is not known. A further advantage of providing a plurality of notches for receiving the ends of the pin is that the tensioning of the springs for urging the panels together may be regulated by the position of the cross pin of the rotatable fastening element with respect to the plate member.

It is an object of my invention, therefore, to provide a fastening device of the character above noted which incorporates a novel form of spring for urging the panels together in the interlocked positions of the fastening elements.

A further object of my invention is to provide a novel form of plate member for the non-rotatable element of the fastening device to enable utilization of the fastening device with panels or other parts having a considerable variation in their thicknesses.

Other objects and advantages of my invention will appear from the detailed description.

It will be understood that the invention is applicable for use in other instances than airplane cowlings, but it is particularly useful in this field, and hence it will be understood that the following description is only illustrative of one application of the invention.

Now, in order to acquaint those skilled in the art with the manner of constructing and operating a device in accordance with the teachings of my invention, I shall disclose in conjunction with the accompanying drawings a preferred embodiment of the invention.

In the drawings:

Figure 1 is a sectional view through the several parts of the fastening device of my present invention spaced apart and in disassembled relation, and showing a pair of panels in section which are adapted to be secured together by the fastening device herein disclosed;

Figure 2 is a side elevation, partly in section, of a pair of studs comprising the rotatable fastening element of my present invention showing how they may be positioned with respect to each other providing a guide or gauge for inserting a cross pin in the end of one of the stud members;

Figure 3 is an elevational view of the outside surface of a panel secured to another panel disposed therebelow by the fastening device of the present invention;

Figure 4 is a plan view of one of the spring members, looking toward the concave surface thereof, associated with the non-rotatable fastening element of the fastening device of my invention.

Figure 5 is a bottom view of the plate member of the non-rotatable fastening element of my invention;

Figure 6 is a detail sectional view through a pair of panels, with the detachable fastening means of the present invention in interlocked position, and with the rotatable fastening element shown in elevation taken substantially on line 6—6 of Figure 8;

Figure 7 is a detail sectional view similar to Figure 6 but with the detachable fastening elements of the present invention in their released positions, and with the rotatable fastening element shown in elevation;

Figure 8 is a bottom view of Figure 6;

Figure 9 is a view taken substantially on the line 9—9 of Figure 6, looking in the direction indicated by the arrows;

Figure 10 is a detail vertical sectional view taken substantially on the line 10—10 of Figure 6, looking in the direction indicated by the arrows; and Figure 11 is a sectional view, certain parts being shown in elevation, indicating another position of the rotatable fastening element with respect to the stationary or non-rotatable element.

In the several views of the drawings, I have shown a pair of plate members or panels 15 and 16 which are adapted to be detachably secured together by the fastening means 17 of my present invention. For purposes of this disclosure, the fastening means 17 will be described in conjunction with the cowling of an airplane, and it will be understood that the plate or panel 15 comprises or represents the removable cowling, and the plate member or panel 16 comprises a portion of the body of the airplane to which the cowling 15 is adapted to be removably attached. The fastening means 17 comprises a rotatable fastening element 18 having a stud portion 19 at one end of which an enlarged operating head 20 is formed with a screw driver kerf 21 for receiving a screw driver to rotate this element. A pin 22 extends transversely of the longitudinal axis of the stud portion 19 at the other end thereof, and is provided with an intermediate serrated portion 23 and frusto-conical portions 24 terminating in end annular portions 25. The serrated portion 23 fits in the cylindrical opening 26 formed in the enlarged annular end portion 29 of the stud 19 opposite the head 20, and the teeth formed by the serrations 23 bite into the metal of the stud 19 to securely retain the pin 22 in position. Normally the pin 22 will be assembled with the stud 18 to a panel or plate member, such as 15, where suitable tools are readily available for inserting the pin 22 in the opening provided therefor in the stud 19. However, upon reference to Figure 2 it will be seen that a pair of the stud members may be disposed in juxtaposition with their flat sides abutting in vertical stacked relation and supported upon a suitable platform with their cylindrical openings 26 in vertical alignment. With the pair of studs in this position a pin 22 may be driven by any hammering tool into the uppermost stud member with the lower stud 19 acting as a gauge in receiving the annular end portion 25 and frusto-conical portion 24 of one end of the pin 22 to provide the assembled rotating fastening element. It will be observed that the combined length of the frusto-conical portion 24 and the annular end portion 25 is equal substantially to the thickness of the enlarged annular portion of the end of the stud opposite the enlarged operating head portion 18.

Preferably, the pin 22 is of greater length than the diameter of the hole 27 formed in the panel and retains this rotatable assembly of the fastening element 18 with the panel 15. Preferably, though not necessarily, plate 15 is beveled, as at 28, surrounding the opening 27 at an angle which corresponds to the angle of the annular beveled surface of the head portion 20, so that the head portion is adapted to lie substantially flush with the outer surface of the plate or panel 15, in the closed position of the fastening device, as will be clear from Figures 6, 10, and 11.

A second or non-rotatable fastening element comprises a plate member 30 having an opening 31 for receiving the stud 19 of the rotatable fastening element 18, and a pair of diametrically opposed slots 32 extend into the plate 30 from the opening 31. The plate member 30, in the embodiment of the invention shown, comprises a pair of flanged elements 35 extending coaxially of the longitudinal axis of the stud, which flange elements are formed with inclined edges 35ᵃ extending in a direction away from the base of the plate member for receiving the annular end portions 25 of the pin of the rotatable fastening element in any one of a number of desired positions. The plate member 30 is of non-circular configuration, as viewed in plan, and is adapted to be disposed in a housing 40, of similar configuration when viewed in plan to the configuration of the plate member 30, to prevent substantial rotational movement of the plate member 30 within the housing 40. The plate member 30 preferably is similar in plan but of smaller dimension than the housing so that it is shiftable laterally within the housing to align the opening therein with the opening in the removable panel or cowling 15 to make provision for possible misalignment of the parts to be assembled together or misalignment of apertures therein. The flanges 35 extend through the base of the housing 40, through a suitable opening 42 formed therein. The opening 42 is of greater radial extent than the flanges 35, as shown, to permit movement of plate member 30 laterally, or in its plane, relative to housing 40 as and for the reason above stated. A pair of substantially concavo-convex spring members 43, also substantially of the configuration in plan of the plate member 30, and the housing 40 are positioned with their concave surfaces facing one another and disposed within the housing 40 between the plate member 30 and the panel 16. The spring members 43 are formed with circular openings 45 (see Figure 4) to permit passage of the pin 22 therethrough. The second or non-rotatable fastening element 30 and the spring elements 43 are disposed in the housing 40, as shown in Figures 6 and 7 of the drawings, and the lugs 47 are turned inwardly of the side walls of the housing to secure the spring members 43 and plate member 30, comprising the non-rotatable fastening element, in position within the housing 40.

A pair of tongue members 49 are formed integrally with the housing and are provided with openings 50 through which rivets 51 extend into openings 52 suitably formed in the plate member 16 and the rivets are then peened over to secure the assembled unit to the plate or panel 16.

With the rotatable fastening element assembled to the plate 15 as described, and with the housing 40 including the non-rotatable fastening element 30 and the spring members 43 assembled therein and secured to the plate member 16, it will be seen that the plate members 15 and 16 may be detachably secured together by inserting the stud portion 19 and pin 22 through the opening 55 of plate member 16, through the openings 45 of the spring members 43, and the opening 31 and slots 32 of the non-rotatable fastening element or plate member 30, and then by rotating the fastening element 18 the annular ends of the pin may be caused to engage in any of the several notches 56 formed in the inclined edges 35ª of the flanges of the plate member 30, whereupon the spring members 43 are compressed, urging the plate 15 toward the plate 16 to bias them together. The plurality of notches provided in the flange elements of the plate member 30 accommodates the application of the fastening device of my present invention to panels of varying thicknesses, and also the position of the pin relative to the notches of the flanges of the plate member may be utilized to obtain varying degrees of compression of the spring members 43.

It is an important feature of the present invention to provide the pair of substantially concavo-convex spring members assembled with their concave surfaces facing one another, for upon continued use of the fastening element of the present invention the spring members will act to bias each other away upon release of the interlocked positions of the fastening elements so that the parts will not take a "set." Also, by utilizing a pair of spring members of the character referred to, a reduction in height of the housing 40 enclosing the several parts of the spring fastening element is attained, providing for use of the fastener in installations in which there is a minimum of space available for accommodating the fastener.

It will be observed that the fastening element or plate 30 and the spring members 43 are restrained by the housing against rotation, and that this fastening element 30 may move axially of the longitudinal axis of the stud portion 19 of the rotatable fastening element 18. It will be observed, therefore, that the non-rotatable fastening element 30 and the spring members 43 are not mechanically secured to any of the parts, but are movable within the housing 40 axially of the axis of the rotatable element 18. Referring to Figures 6 and 7, it will be seen that in Figure 6 the fastening elements are shown in their engaged position with the annular ends of the pin 22 in one of the notches 56 formed in the edges of the inclined flange elements 35 of the plate member 30, and in Figure 7 the fastening elements are shown in their disengaged position with the base of plate member 30 seated on the end wall of housing 40.

While I have shown what I consider to be the preferred embodiment of my invention, it will be understood that various modifications and rearrangements may be made therein without departing from the scope of my invention.

I claim:

1. For use in a fastening device for detachably fastening together inner and outer superposed panels wherein the outer one of said panels is provided with a rotatable fastening member having a pin at its inner end the axis of which extends substantially at right angles to the axis of rotation thereof, a non-rotatable fastening member comprising a housing secured to the inner face of said inner panel, a non-rotatable fastening plate member in said housing overlying the inner wall thereof and having an opening with two flange elements concentric with said opening extending inwardly through an opening in said inner wall of said housing, said flange elements being provided at their inner ends with oppositely related inclined cam surfaces each having a plurality of notches therein, a pair of contacting concavo-convex springs disposed in said housing with their concaved surfaces opposed and confined between said plate member and said outer panel, said plate member having diametrically opposite slots therein, the opening of said inner panel being adapted for the insertion of the rotatable fastening member therethrough, and the slots of said plate member being adapted for the insertion of the pin of the rotatable member therethrough for engagement at its end portions with the notches of said cam surfaces upon rotation of said rotatable fastening member, said plate member and said spring being free from said housing.

2. For use in a fastening device for detachably fastening togehter inner and outer superposed panels wherein the outer one of said panels is provided with a rotatable fastening member having a pin at its inner end the axis of which extends substantially at right angles to the axis of rotation thereof, a non-rotatable fastening member comprising a housing secured to the inner face of said inner panel a non-rotatable fastening plate member in said housing overlying the inner wall thereof and having an opening with two flange elements concentric with said opening extending inwardly through an opening in said inner wall of said housing, said flange elements being provided at their inner ends with oppositely related inclined cam surfaces each having a plurality of notches therein, spring means in said housing confined under compression between said plate member and said outer panel, said plate member having diametrically opposite slots therein, the opening of said inner panel being adapted for the insertion of the rotatable fastening member therethrough, and the slots of said plate member being adapted for the insertion of the pin of the rotatable member therethrough for engagement at its end portions with the notches of said cam surfaces upon rotation of said rotatable fastening member, said plate member being free from said housing.

MATHEW J. MARTY.